Dec. 27, 1938.   B. RUBEL ET AL   2,141,226

BAKERY MACHINERY

Filed Sept. 9, 1936

INVENTORS
Bertrand Rubel
Clarence Leab

BY Murray and Zugelter

ATTORNEYS

Patented Dec. 27, 1938

2,141,226

UNITED STATES PATENT OFFICE 2,141,226

BAKERY MACHINERY

Bertrand Rubel and Clarence Leab, Cincinnati, Ohio; said Leab assignor to said Rubel Application September 9, 1936, Serial No. 99,992

12 Claims. (Cl. 198—20)

This invention relates to bakery machinery, and especially to a means for handling bread or other bakery products subsequent to slicing thereof, and prior to a wrapping or packaging operation performed upon the sliced product.

An object of the invention is to provide means for so handling a sliced loaf product or the like, as to preclude disarrangement of the slices and the troublesome effects of slice displacement or disarrangement heretofore occurring at the wrapping or packaging machine.

Another object of the invention is to provide a novel arrangement of means whereby the handling of sliced loaf products is greatly simplified and expedited, thereby minimizing expense, hand labor, and waste of time in the output of bakery goods.

The foregoing and other objects are attained by the means described herein and disclosed in the accompanying drawing, in which.

The introduction of bakery products such as breads or the like in sliced loaf form, has imposed upon the baking establishment certain problems concerned with keeping the loaves assembled from the time they are sliced until subjection thereof to the wrapping or packaging operation. Heretofore, considerable observation and hand labor were required to maintain the continuity of production, due to failure of the loaf slices to remain assembled and aligned when conveyed or subjected to the routine of the baking establishment. The separating of a loaf into its component individual slices during transfer from one machine or conveyor to another often resulted in confusion and an interruption to the production program of the establishment. One of the primary objects of the present invention is to eliminate the difficulties referred to, so as to effect a saving of time, labor and expense in the production of sliced loaf products. Throughout this description, it is intended that the terms "sliced loaf" or "presliced bakery product", shall include breads of all kinds, and products of any nature made up in loaf formation and sliced for the convenience of the consumer, to whom the product is supplied in wrapped or packaged form.

Referring now to the accompanying drawing, which more or less conventionally shows the device of the invention related to other elements of a baking establishment, the character 6 indicates any known type of slicing mechanism to which a loaf may be subjected after having been baked. At 7 is indicated any known type of wrapping mechanism adapted to operate upon the presliced loaf and apply thereto a suitable envelope or wrapper in a well known manner.

Figure 1:
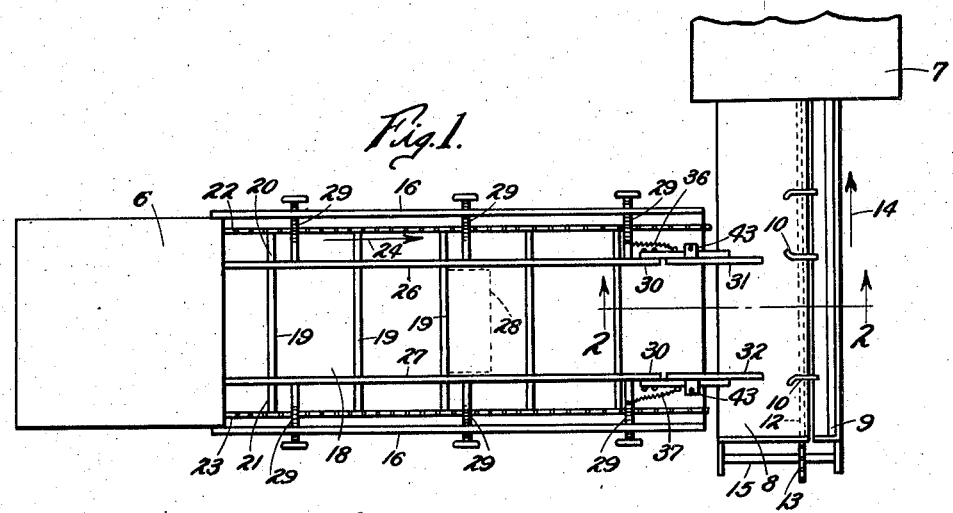
Fig. 1 is a plan view of the machine embodying the invention.
Figure 2:
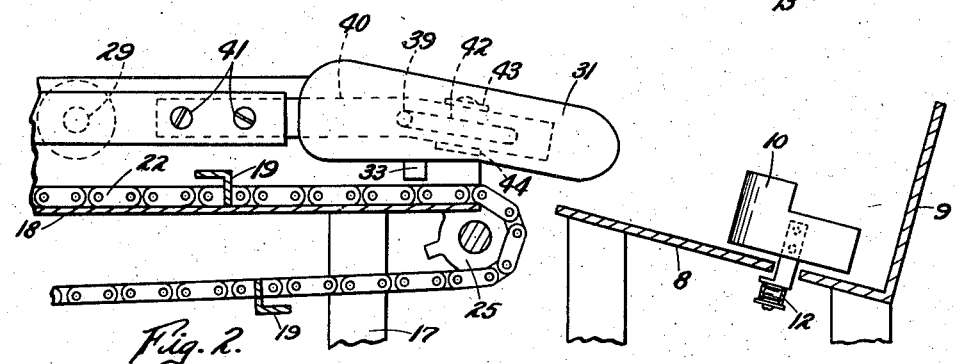
Fig. 2 is an enlarged cross sectional view taken on line 2—2 of Fig. 1.
Figure 3:
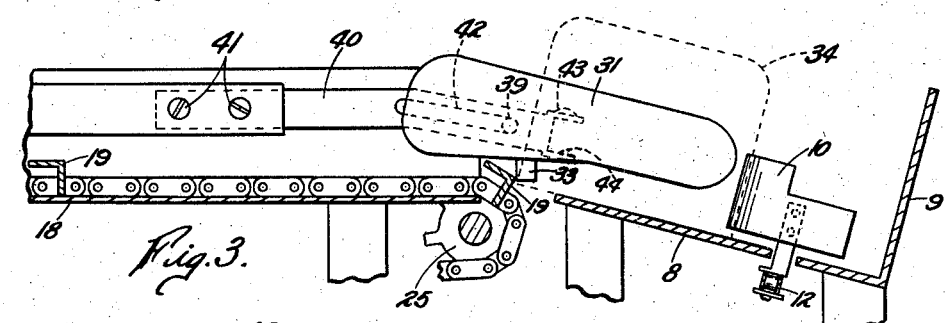
Fig. 3 is a view similar to Fig. 2 showing the operating parts in loaf transferring position.

The wrapping mechanism is adapted to be fed automatically with assembled sliced loaves, by means of a suitable conveyor, one form of which is disclosed at the right of Figs. 1, 2 and 3. This conveyor may be in the form of a trough constituted of an inclined bottom 8 and a cooperative inclined side wall 9 disposed angularly and at a proper inclination to support the bottom and one side of any assembled sliced loaf. By preference, the inclination of the bottom wall is such that gravity may act upon the constituents of the sliced loaf, as the loaf is moved along the trough by means to be described, with the result that the individual slices tend to gravitate toward the angle included between walls 8 and 9, thereby to maintain the individual slices in aligned relationship. Any suitabe type conveyor means may be employed for feeding the assembled loaves to the wrapping mechanism, there being shown by way of example, a plurality of pairs of receiving arms 10—10 fixed in spaced relationship upon a conveyor belt or endless chain 12 supported upon a pair of sprockets, one of which is shown at 13. The conveyor belt or chain is adapted to be power actuated so as to move the receiving arms toward the wrapping mechanism in the direction of the arrow 14. The character 15 indicates a shaft supporting the sprocket 13. The receiving arms 10—10 are to be fixed to the conveyor belt or chain with any desired or predetermined distance between them, depending on the length of a loaf to be handled. The forward ends of the receiving arms may be tapered or turned outwardly, as indicated in Fig. 1.

For feeding the assembled loaves from the slicing mechanism to the transverse conveyor of the wrapping mechanism, there is provided a frame 16 mounted upon suitable supports 17 and including a bed plate or table 18 over which a series of pusher elements 19 is adapted to move for advancing the assembled sliced loaves discharged from the slicing mechanism. The pusher elements may be of any suitable formation, those shown being in the form of angle iron bars each of which has opposite ends 20 and 21 fixed, respectively, to an endless movable conveyor that preferably comprises a pair of endless chains or belts 22 and 23. The upper run of each chain may rest upon or move in the plane of the bed plate or table 18, so that the pusher elements may properly engage and advance the assembled loaves along the table and toward the conveyor of the wrapping mechanism. The endless chains 22 and 23, of course, move in unison and at the same speed, so that the pusher elements are always at substantial right angles thereto. The direction of movement of the pusher elements is indicated by the arrow 24. Each of the chains is conventionally supported upon a pair of sprockets, one of which is indicated at 25 in Fig. 2. Above the bed plate or table, there is provided a pair of spaced parallel guides 26 and 27, which may be in the form of longitudinal plates or strips placed on edge, said guides serving to embrace an assembled sliced loaf 28 as indicated in Fig. 1. Suitable mounting means for the guides 26 and 27 are indicated by the characters 29, these mountings being supported by the frame parts 16 or by any other stationary support. The particular structure of the guide mounting means 29 is immaterial to the invention, suffice it to say that they may be adjustable transversely to the frame parts 16—16 for increasing or decreasing the space between the guides 26 and 27 in the event that the apparatus is to accommodate loaves of different lengths. From the foregoing, it should be understood that each pusher element 19 is adapted to advance a pre-sliced assembled load along the bed plate or table 18 for final disposition thereof between the receiving arms of the conveyor 12, while the spaced parallel guides 26 and 27 function to maintain the loaves assembled by applying slight pressure to the opposite ends of the loaves. The pusher elements, being straight and at substantial right angles to the guides, maintain the slices in alignment upon the bed plate or table 18 throughout the travel of the loaves under the influence of the pusher elements.

Upon reaching the discharge end of the conveyor which includes the pusher elements, it is necessary to transfer the loaves bodily to the receiving arms 10—10. This is accomplished without disarrangement of the slices, by means of a reciprocating transfer mechanism which will now be described.

At or near the ends 30—30 of the guides 26 and 27, there is provided a pair of spaced parallel pressure plates 31 and 32 which are adapted to be bodily shifted from the normally retracted position of Figs. 1 and 2 to an operative extended position shown in Fig. 3. These pressure plates normally function as continuations of the guides 26 and 27, so that the succession of pusher elements will place assembled sliced loaves between said plates just prior to movement of the pusher elements over the sprockets 25. In thus advancing the loaves and positioning them between the pressure plates, the pusher elements or equivalent means on the chains, contact and advance the pressure plates to the Fig. 3 position at which they overhang the transverse conveyor 8—9 in position to deposit a loaf thereon and between the receiving arms 10—10. Although the advancement of the pressure plates may be effected in various ways, the accompanying drawing exemplifies one form of means which may be relied upon to accomplish the result desired. For example, each pressure plate may be provided with a fixed projection or abutment 33 which normally rests in the path of movement of the pusher elements 19 (see Fig. 2), so that the pusher elements may successively contact and move the projections or abutments in the manner disclosed in Fig. 3, as said pusher elements move downwardly along the sprocket to the lower run of the conveyor chain or belt. The character 34 indicates the approximate position of a loaf as advanced to the receiving arms 10—10 in the extended or advanced position of the pair of pressure plates 31—32.

Figure 4:
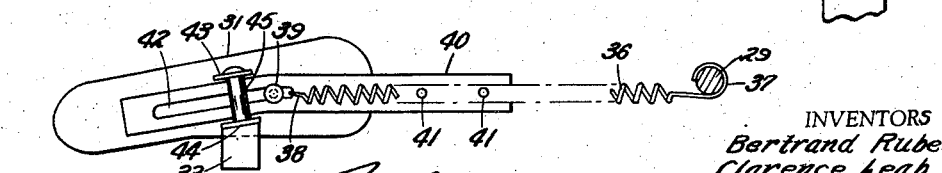
Fig. 4 is an enlarged view showing details of a transfer means which embodies the invention.

Of considerable importance is the fact that the pair of pressure plates is very suddenly returned from the advanced position of Fig. 3, to the retracted position of Fig. 2, as the pusher element 19 of Fig. 3 releases its hold, or its engagement upon the projection or abutment 33. In accordance with the present invention, the pressure plates are returned to the normal or retracted position of Fig. 2, by means of substantial springs, which impart to the pressure plates a sudden retractile movement such as will avoid any frictional hold of the plates upon the loaf ends and thereby cause the loaf to be immediately received in the embrace of the arms 10—10 of the transverse conveyor. The springs for effecting the quick action return movement of the pressure plates, are indicated at 36 and 37 of Fig. 1. For a detailed disclosure, reference may be had to Fig. 4, which shows the spring 36 having one end 37 connected in fixed relationship to a part of the machine frame, which may be one of the supports 29, whereas the opposite end 38 of the spring is fixed to a stud or pin 39 carried by the pressure plate 31. Although the particular means of mounting the pressure plates may take various forms, there is shown a mounting arm 40 fixed to the frame or to a guide 26 or 27 in any suitable manner, such as by means of screws or bolts 41, said arms extending slightly downwardly and toward the transverse conveyor to provide a track or guide for the pressure plates. A suitable guide means for the plate upon the mounting arm 40 may be furnished by providing an elongated guide slot 42 in the arm, in which slot the headed stud or pin 39 is received. Each pressure plate may be provided also with a pair of spaced lugs 43 and 44 bridged by a suitable pin or connector 45 which bears upon or embraces the forward end of the mounting arm in the region of the slot 42, to preclude rotation of the pressure plate about the guide pin or stud 39. It should be appreciated that the particular means resorted to for guiding the pressure plates along the mounting arms 40 may be altered considerably as to engineering design, the means illustrated being merely exemplary of a construction that will perform the function intended. For example, the parts 43, 44 and 45 might readily be replaced by a second headed stud or pin such as 39 mounted upon the plate in spaced relationship to the pin or stud shown.

By means of the combination of elements herein set forth, assembled sliced loaves may be handled effectively and without interruption to the continuity of bakery routine, due to the fact that the loaves can at no time separate or distribute their constituent parts over the machinery that handles the loaves. The quick action retractile movement of the pressure plates which constitute the reciprocable transfer means, results in a positive sudden release of the loaves to the arms of the transverse conveyor, without displacement of any of the slices constituting the loaves, and the particular form of the transverse conveyor which feeds the wrapping mechanism maintains a perfect disposition or alignment of adjacent slices of the loaf until the wrapping is applied thereto by the wrapping mechanism. It is to be understood that the pressure plates 31 and 32 of the reciprocating transfer means preferably are identical in construction, and that they operate simultaneously in moving at pusher element speed while advancing loaves to the transverse conveyor, and while returning suddenly or with a snap action at high speed to the normal position of Figs. 1 and 2.

As stated previously, various modifications and changes may be made in the structural details of the device, without departing from the spirit of the invention.

In order to readily set forth the invention disclosed herein, and to obviate unnecessary details in view of the prior art, it is to be understood that heretofore, in devices intended to effect transfer of a plurality of slices of bread from a cutting machine to a conveyor used for feeding the assembled slices to the wrapping mechanism, there have been used everything shown herein, including means for adjusting the guides 26, 27 and arms 10, 10 to accommodate loaves of different lengths. In prior devices, the guides 26, 27 are extended so they terminate immediately adjacent the path of the arms 10. It is very common for such prior devices to fail to function properly and the present invention is intended to obviate the failure of such equipment incident to transfer of the slices from the conveyor of the slicing machine to the conveyor of the wrapping machine.

While the invention is disclosed and described herein in connection with bread slicing and sliced bread wrapping equipment, it is obvious that the same transfer problem may exist in other arts wherein there is also involved the transfer of assembled units, each comparable to a slice of bread, from one conveyor to another conveyor or from one pair of pocket forming means for such assembled units to another pocket forming means in which the units are to be retained in substantially unchanged relationship. The appended claims are therefore to be understood as being commensurate with the invention and not limited to the specific art employed for the purpose of illustration of the invention.

What is claimed is:

1. An apparatus for handling a group of disconnected flatly contacting slab-like objects as a unitary assembly, said apparatus comprising means for supporting said objects on edge and for moving said objects in a direction parallel to their plane faces, opposed normally stationary guide walls extending in the direction of advancement of the objects and located to contact the endmost objects of the assembly so as to keep them in an upright position with intermediate ones of the objects in contacting relationship, transfer means comprising a reciprocable plate at an end of each guide wall, each plate forming a continuation of a guide wall so that an assembly advanced along the guide walls will enter between the spaced plates to be thereby frictionally embraced, means for simultaneously projecting the plates with the assembly held thereby, at substantially the rate of advancement of the object imposed by the supporting means, and means operating to suddenly retract the plates for releasing therefrom the assembly held thereby.

2. An apparatus for handling a group of disconnected flatly contacting slab-like objects as a unitary assembly, said apparatus comprising means for supporting said objects on edge and for moving said objects in a direction parallel to their plane faces, opposed guide walls extending in the direction of advancement of the objects and located to contact the endmost objects of the assembly so as to keep them in an upright position with intermediate ones of the objects in contacting relationship, transfer means comprising a plate at an end of each guide wall, each plate forming a continuation of a guide wall so that an assembly advanced along the guide walls will enter between the spaced plates to be thereby frictionally embraced, means for simultaneously projecting the plates with the assembly held thereby, at substantially the rate of advancement of the object imposed by the supporting means, means operating to suddenly retract the plates for releasing therefrom the assembly held thereby, and a receiver for the released assembly comprising a transversely disposed trough having meeting walls inclined to support two adjacent edges of each slab-like object and to thereby maintain the alignment of said objects after being released from the transfer means.

3. An apparatus for handling a group of disconnected flatly contacting slab-like objects as a unitary assembly, said apparatus comprising means for supporting said objects on edge and for moving said objects in a direction parallel to their plane faces, opposed guide walls extending in the direction of advancement of the objects and located to contact the endmost objects of the assembly so as to keep them in an upright position with intermediate ones of the objects in contacting relationship, transfer means comprising a plate at an end of each guide wall, each plate forming a continuation of a guide wall so that an assembly advanced along the guide walls will enter between the spaced plates to be thereby frictionally embraced, means for simultaneously projecting the plates with the assembly held thereby, at substantially the rate of advancement of the object imposed by the supporting means, means operating to suddenly retract the plates for releasing therefrom the assembly held thereby, a receiver for the released assembly comprising a transversely disposed trough having meeting walls inclined to support two adjacent edges of each slab-like object and to thereby maintain the alignment of said objects after being released from the transfer means, and a conveyor associated with the trough and including pairs of arms spaced and synchronized in movement to receive therebetween successive assemblies released by the transfer means.

4. In a device for transferring an aligned assembly of unitary objects the combination of a plate-like member over which a group of unitary objects may be moved in an aligned relationship, means disposed at each end of the path traversed by such aligned group of objects for providing a channel through which the objects are moved, a drive means for moving said group of objects in aligned relationship through said channel, pocket forming means movable to and from a position spaced from and in substantial alignment with said channel forming means and into the pocket of which the aligned group of objects may be received, bridging means in substantial alignment with said channel forming means for operation between said channel forming means and said pocket forming means for bridging the space between the channel forming means and the pocket forming means when the pocket forming means is aligned with said channel forming means, means including the drive means aforesaid for contacting and advancing the said bridging means to a limit of travel in substantial unison with the movement of an aligned assembly of objects from said channel into said pocket, means for terminating said contacting and advancing relationship at the end of the limit of travel, and means for then retracting said bridging means from the path of movement of said pocket means.

5. In a device for transferring an aligned assembly of unitary objects the combination of a plate-like member over which a group of unitary objects may be moved in an aligned relationship, means disposed at each end of the path traversed by such aligned group of objects for providing a channel through which the objects are moved, a drive means for moving said group of objects in aligned relationship through said channel, pocket forming means movable to and from a position spaced from and in substantial alignment with said channel forming means and into the pocket of which the aligned group of objects may be received, bridging means in substantial alignment with said channel forming means for operation between said channel forming means and said pocket forming means for bridging the space between the channel forming means and the pocket forming means when the pocket forming means is aligned with said channel forming means, means including the drive means for advancing the said bridging means in substantial unison with the movement of an aligned assembly of objects from said channel into said pocket, a release operative to terminate the advancement of the bridging means, and means yieldingly resisting advancing movement of said bridging means and returning said bridging means to retracted position upon release of said bridging means from said means for advancing the bridging means.

6. An apparatus for handling as a unit, a group or assembly of disconnected flat slab-like objects, having adjacent flat faces of said objects in contact upon one another, said apparatus comprising means for supporting said objects in upright position and on edge and for moving said objects in a direction parallel to their contacting flat faces, opposed and spaced guide walls extending in the direction of movement of the objects and located to contact the endmost objects of the assembly so as to keep them in upright position with intermediate ones of the objects in contacting relationship, transfer means comprising a plate at an end of each guide wall, each plate forming a continuation of a guide wall so that an assembly advanced along the guide walls will enter between the spaced plates and be supported between said plates, means for projecting the plates with the assembly supported thereby, at substantially the rate of movement of the objects imposed by the article moving means, means operating to suddenly retract the plates for releasing the assembly supported thereby, a receiver for the released assembly and comprising spaced receiver arms between pairs of which arms the plates are adapted to guide the assembly prior to retraction of the plates, and means cooperating with the receiver arms for maintaining the relationship of the objects after release thereof from the plates.

7. An apparatus for handling as a unit, a group or assembly of disconnected flat slab-like objects, having adjacent flat faces of said objects in contact upon one another, said apparatus comprising means for supporting said objects in upright position and on edge and for moving said objects in a direction parallel to their contacting flat faces, opposed and spaced guide walls extending in the direction of movement of the objects and located to contact the endmost objects of the assembly so as to keep them in upright position with intermediate ones of the objects in contacting relationship, transfer means comprising a plate at an end of each guide wall, each plate forming a continuation of a guide wall so that an assembly advanced along the guide walls will enter between the spaced plates and be supported between said plates, means for projecting the plates with the assembly supported thereby, at substantially the rate of movement of the objects imposed by the article moving means, means operating to suddenly retract the plates for releasing the assembly supported thereby, a receiver for the released assembly and comprising spaced receiver arms between pairs of which arms the plates are adapted to guide the assembly prior to retraction of the plates, means cooperating with the receiver arms for maintaining the relationship of the objects after release thereof from the plates, and means for successively advancing pairs of receiver arms into position for receiving an assembly of objects from the plates and for advancing the assemblies of objects without disturbing the relationship of the individual objects in any assembly thereof.

8. The combination with a pair of angularly disposed conveyors of means for conveying an assembly of objects in assembled form, and including a transfer means comprising spaced movable pressure plates arranged to embrace the ends of the assembly of objects and to hold the constituents thereof in assembled condition while transferring the same from one conveyor to the other, said transfer means being equipped with a snap action return mechanism whereby to release the assembled objects as a unit from the transfer means.

9. The combination with a pair of angularly disposed conveyors of means for supporting an assembly of objects on edge and for moving said objects in a direction parallel to their plane faces, opposed guide walls extending in the direction of advancement of the objects and located to contact the endmost objects of the assembly so as to keep them in an upright position with intermediate ones of the objects in contacting relationship, movable transfer means adapted to transfer said assembly from one of said conveyors to the other and comprising a plate at an end of each guide wall, each plate forming a continuation of a guide wall so that an assembly advanced along or between the guide walls will enter between the spaced plates to be thereby frictionally held, means for simultaneously projecting the plates intermittently with the assembled objects held thereby, at substantially the rate of advancement of the objects imposed by the supporting means, and means operating between intermittent projections to suddenly retract the plates thereby releasing therefrom the assembly of objects held thereby into one of said angularly disposed conveyors.

10. A transfer mechanism for advancing and depositing an assembly of flat objects in face to face contacting relationship, said mechanism comprising a frame and driven means supported by the frame for advancing said objects edgewise as an assembled unit, a pair of pressure plates spaced apart and arranged to receive and embrace the endmost ones of the flat objects with the intermediate objects of the assembly interposed therebetween, means mounting said pressure plates for unitary reciprocating movement relative to the frame, cooperative elements on the driven means and the pair of pressure plates adapted to engage as the element of the driven means advances toward the element of the pair of pressure plates, for moving the pair of pressure plates in one direction of reciprocation, means for effecting disengagement of said cooperative elements upon movement of the pair of pressure plates to a limit of travel, and means operating to suddenly return the pressure plates to the receiving position upon disengagement of the cooperative elements aforesaid, for releasing and depositing the assembly of objects.

11. A transfer mechanism for advancing and depositing an assembly of flat objects in face to face contacting relationship, said mechanism comprising a frame and driven means supported by the frame for advancing said objects edgewise as an assembled unit, a pair of pressure plates spaced apart and arranged to receive and embrace the endmost ones of the flat objects with the intermediate objects of the assembly interposed therebetween, means mounting said pressure plates for unitary reciprocating movement relative to the frame, cooperative elements on the driven means and the pair of pressure plates adapted to engage as the element of the driven means advances toward the element of the pair of pressure plates, for moving the pair of pressure plates in one direction of reciprocation, means for effecting disengagement of said cooperative elements upon movement of the pair of pressure plates to a limit of travel, a conveyor movable transversely of the direction of reciprocation of the pressure plates, means on said conveyor located to receive the assembly of objects released by the pressure plates, and means for driving said conveyor to carry away the assembly of objects.

12. A transfer mechanism for advancing and depositing an assembly of flat objects in face to face contacting relationship, said mechanism comprising a frame and driven means supported by the frame for advancing said objects edgewise as an assembled unit, a pair of pressure plates spaced apart and arranged to receive and embrace the endmost ones of the flat objects with the intermediate objects of the assembly interposed therebetween, means mounting said pressure plates for unitary reciprocating movement relative to the frame, cooperative elements on the driven means and the pair of pressure plates adapted to engage as the element of the driven means advances toward the element of the pair of pressure plates, for moving the pair of pressure plates in one direction of reciprocation, means for effecting disengagement of said cooperative elements upon movement of the pair of pressure plates to a limit of travel, a receiving trough extending transversely of the direction of reciprocation of the pressure plates and adjacent to the plates, said trough including walls whose planes meet at an angle and at an inclination such that the objects placed thereon tend to gravitate toward said angle, and means for moving the deposited assemblies of objects along the trough.

BERTRAND RUBEL.
CLARENCE LEAB.